(12) United States Patent
Kiss et al.

(10) Patent No.: US 8,930,187 B2
(45) Date of Patent: *Jan. 6, 2015

(54) METHODS, APPARATUSES AND COMPUTER PROGRAM PRODUCTS FOR IMPLEMENTING AUTOMATIC SPEECH RECOGNITION AND SENTIMENT DETECTION ON A DEVICE

(75) Inventors: Imre Attila Kiss, Arlington, MA (US); Joseph Polifroni, Arlington, MA (US); Francois Mairesse, Boston, MA (US); Mark Adler, Lexington, MA (US)

(73) Assignee: Nokia Corporation, Espoo (FI)

( * ) Notice: Subject to any disclaimer, the term of this patent is extended or adjusted under 35 U.S.C. 154(b) by 381 days.

This patent is subject to a terminal disclaimer.

(21) Appl. No.: 13/342,534

(22) Filed: Jan. 3, 2012

(65) Prior Publication Data

US 2013/0173264 A1 Jul. 4, 2013

(51) Int. Cl.
*G10L 15/00* (2013.01)

(52) U.S. Cl.
USPC ........... 704/231; 704/246; 704/247; 704/251; 704/252; 704/257

(58) Field of Classification Search
CPC ....... G10L 17/005; G10L 17/02; G10L 17/04; G10L 17/06; G10L 17/24; G10L 15/00; G10L 15/10; G10L 15/08; G10L 15/063; G10L 15/065; G10L 15/265
USPC .......................... 704/246, 247, 251, 252, 257
See application file for complete search history.

(56) References Cited

U.S. PATENT DOCUMENTS

| | | | | |
|---|---|---|---|---|
| 8,145,562 | B2 * | 3/2012 | Wasserblat et al. | 705/38 |
| 8,412,530 | B2 * | 4/2013 | Pereg et al. | 704/270 |
| 8,682,649 | B2 * | 3/2014 | Bellegarda | 704/10 |
| 2008/0215571 | A1 * | 9/2008 | Huang et al. | 707/5 |
| 2010/0121857 | A1 | 5/2010 | Elmore et al. | |
| 2010/0169317 | A1 * | 7/2010 | Wang et al. | 707/736 |
| 2010/0332287 | A1 * | 12/2010 | Gates et al. | 705/10 |
| 2011/0004624 | A1 | 1/2011 | Bansal et al. | |
| 2011/0144971 | A1 * | 6/2011 | Danielson | 704/1 |
| 2011/0208522 | A1 | 8/2011 | Pereg et al. | |
| 2011/0294525 | A1 | 12/2011 | Jonsson | |

OTHER PUBLICATIONS

Adler, et al., U.S. Appl. No. 13/342,684, entitled "Methods, Apparatuses and Computer Program Products for Joint use of Speech and Text-Based Features for Sentiment Detection" filed Jan. 3, 2012.

(Continued)

*Primary Examiner* — Leonard Saint Cyr
(74) *Attorney, Agent, or Firm* — Alston & Bird LLP (57) ABSTRACT

An apparatus for utilizing textual data and acoustic data corresponding to speech data to detect sentiment may include a processor and memory storing executable computer code causing the apparatus to at least perform operations including evaluating textual data and acoustic data corresponding to voice data associated with captured speech content. The computer program code may further cause the apparatus to analyze the textual data and the acoustic data to detect whether the textual data or the acoustic data includes one or more words indicating at least one sentiment of a user that spoke the speech content. The computer program code may further cause the apparatus to assign at least one predefined sentiment to at least one of the words in response to detecting that the word(s) indicates the sentiment of the user. Corresponding methods and computer program products are also provided.

20 Claims, 6 Drawing Sheets

(56) References Cited

OTHER PUBLICATIONS

Schuller, et al., "Recognizing Realistic Emotions and Affect in Speech: State of the Art and Lessons Learnt from the First Challenge," *Speech Communication*, 2011, 26 pages, Available online at www.sciencedirect.com.

Pang, et al., "Opinion Mining and Sentiment Analysis," *Foundations and Trends in Information Retrieval*, 2008, 135 Pages, vol. 2 No. 1-2.

Balahur, et al., "Opinion Mining on Newpaper Quotations," *International Joint Conference on Web Intelligence and Intelligent Agency Technology*, 2009, pp. 523-526, IEEE Computer Society.

Pang, et al., "Seeing Stars, Exploiting Class Relationships for Sentiment Categorization with Respect to Rating Scales," *Proceedings of the ACL*, 2005, 10 pages.

Barbosa, et al., "Robust Sentiment Detection on Twitter from Biased and Noisy Data," *AT&T Labs—Research*, undated, downloaded from the Internet as early as Oct. 28, 2011, 9 pages.

Burfoot, "Using Multiple Sources of Agreement Information for Sentiment Classification of Political Transcripts," *Department of Computer Science and Software Engineering, University of Melbourne, Australia*, undated, downloaded from the Internet as early as Oct. 28, 2011, 8 pages.

Somasundaran, et al. "Detecting Arguing and Sentiment in Meetings," *Department of Computer Science and Department of Intelligent Systems Program, University of Pittsburgh*, undated, downloaded from the Internet as early as October 27, 2011, 9 pages.

Brody, et al., CooooooooooooollIIIIIII!!!!!!!!!! Using Word Lengthening to Detect Sentiment in Microblogs, *School of Communication and Information, Rutgers University*, undated, downloaded from the Internet as early as Oct. 27, 2011, 9 pages.

Szymanski, et al., "TSD 2008 Paper Abstracts," *11th International Conference on Text, Speech and Dialogue*, Sep. 8-12, 2008, http://www.tsdconference.org/tsd2008/abstracts.html.

Poliffroni, et al. "Good Grief, I Can Speak It! Preliminary Experiments in Audio Restaurant Reviews," undated, downloaded from the Internet as early as Oct. 27, 2011, 6 pages.

Renger, et al., "VoiSTV: Voice-Enabled Social TV," *AT&T Labs—Research*, Mar. 2011, 4 pages.

Unknown, "Sentiment Analysis," Call Centre Helper, http://web.archive.org/web/20110524101137/http://www.callcentrehelper.com/wiki/Sentiment_Analysis, earliest Internet Archive WayBackMachine date Apr. 30, 2010, 6 pages.

International Searching Authority, International Search Report and Written Opinion for International Application No. PCT/FI2012/051193, May 20, 2013, 12 pages, National Board of Patents and Registration of Finland, Finland.

International Searching Authority, International Search Report and Written Opinion for International Application No. PCT/FI2012/051194, May 22, 2013, 11 pages, National Board of Patents and Registration of Finland, Finland.

United States Patent and Trademark Office, Office Action for U.S. Appl. No. 13/342,684, Apr. 10, 2014, 14 pages, USA.

* cited by examiner

METHODS, APPARATUSES AND COMPUTER PROGRAM PRODUCTS FOR IMPLEMENTING AUTOMATIC SPEECH RECOGNITION AND SENTIMENT DETECTION ON A DEVICE

TECHNOLOGICAL FIELD

An example embodiment of the present invention relates generally to signal processing and more particularly, relates to a method, apparatus and computer program product for providing automatic speech recognition and sentiment detection on communication devices.

BACKGROUND

The modern communications era has brought about a tremendous expansion of wired and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to provision of speech-based content via communication devices.

For instance, currently, applications for voice user interfaces that create speech-based content are being utilized. The usefulness of these applications may be greatly enhanced if they are coupled with automatic sentiment detection (SD). At present, many applications performing sentiment detection operate solely on a text level by analyzing textual words. However, speech typically carries information about sentiment that is supplemental to the words spoken. At present, carrying out signal processing independently or separately for these textual and speech based sentiment tasks may unnecessarily increase processing load and latency and may also reduce the battery life of a communication device.

As such, it may be beneficial to provide an efficient and reliable mechanism for combining textual and acoustic information to perform sentiment detection for generating content.

BRIEF SUMMARY

A method, apparatus and computer program product are therefore provided for enabling provision of an efficient and reliable manner of utilizing textual data and acoustic data corresponding to speech content to detect sentiment. The sentiment may be based on the speech content which may be spoken by a user. In one example embodiment, the speech spoken by the user may correspond to a spoken review. However, the speech may correspond to any suitable spoken data.

In an example embodiment, items of detected textual sentiment and acoustic sentiment may be determined based on the speech content and one or more ratings (e.g., star ratings (e.g., one star up to five star ratings, etc.)) corresponding to attributes (e.g., price, service, quality, ambience, etc.) related to an entity (e.g., a business) or domain may be generated. In this regard, the ratings may be utilized to generate a corresponding review. The generated review may be based on the spoken review of the user.

In one example embodiment, a method for utilizing textual data and acoustic data to determine sentiment is provided. The method may include evaluating textual data and acoustic data corresponding to voice data associated with captured speech content. The method may also include analyzing the textual data and the acoustic data to detect whether the textual data or the acoustic data includes one or more words indicating at least one sentiment of a user that spoke the speech content. The method may also include assigning at least one predefined sentiment to at least one of the words in response to detecting that the word indicates the sentiment of the user.

In another example embodiment, an apparatus for utilizing textual data and acoustic data to determine sentiment is provided. The apparatus may include a processor and memory including computer program code. The memory and the computer program code are configured to, with the processor, cause the apparatus to at least perform operations including evaluating textual data and acoustic data corresponding to voice data associated with captured speech content. The memory and computer program code are configured to, with the processor, cause the apparatus to analyze the textual data and the acoustic data to detect whether the textual data or the acoustic data includes one or more words indicating at least one sentiment of a user that spoke the speech content. The memory and computer program code are configured to, with the processor, cause the apparatus to analyze the textual data and the acoustic data to detect whether the textual data or the acoustic data may include one or more words indicating at least one sentiment of a user that spoke the speech content.

In another example embodiment, a computer program product for utilizing textual data and acoustic data to determine sentiment is provided. The computer program product includes at least one computer-readable storage medium having computer-executable program code portions stored therein. The computer-executable program code instructions may include program code instructions configured to evaluate textual data and acoustic data corresponding to voice data associated with captured speech content. The program code instructions may also be configured to analyze the textual data and the acoustic data to detect whether the textual data or the acoustic data includes one or more words indicating at least one sentiment of a user that spoke the speech content. The program code instructions may also be configured to assign at least one predefined sentiment to at least one of the words in response to detecting that the word indicates the sentiment of the user.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As referred to herein, a sentiment(s) may denote determining a person's attitude with respect to some topic through their spoken input. The attitude may relate to the person's opinion, judgment, evaluation or the like, an emotional state of the person or any other feelings of the person. In other words, a sentiment(s) may denote indications of opinions, evaluations, judgments, feelings, emotions and stances of words spoken by a person(s). In an example embodiment, detected sentiments associated with speech content may be classified into one or more predefined sentiments including, but not limited to, positive, negative, neutral, or a numeric rating from a scale such as, for example, three stars on a scale of five stars, or the like.

As referred to herein, prosody may denote the rhythm, stress, and intonation of speech content. In this regard, prosody may reflect various features of a person's speech including, but not limited to, the emotional state of the speech, the form of the speech (e.g., a statement, question, or command), the presence of irony or sarcasm, emphasis, contrast, focus, or any other suitable features.

Figure 1:
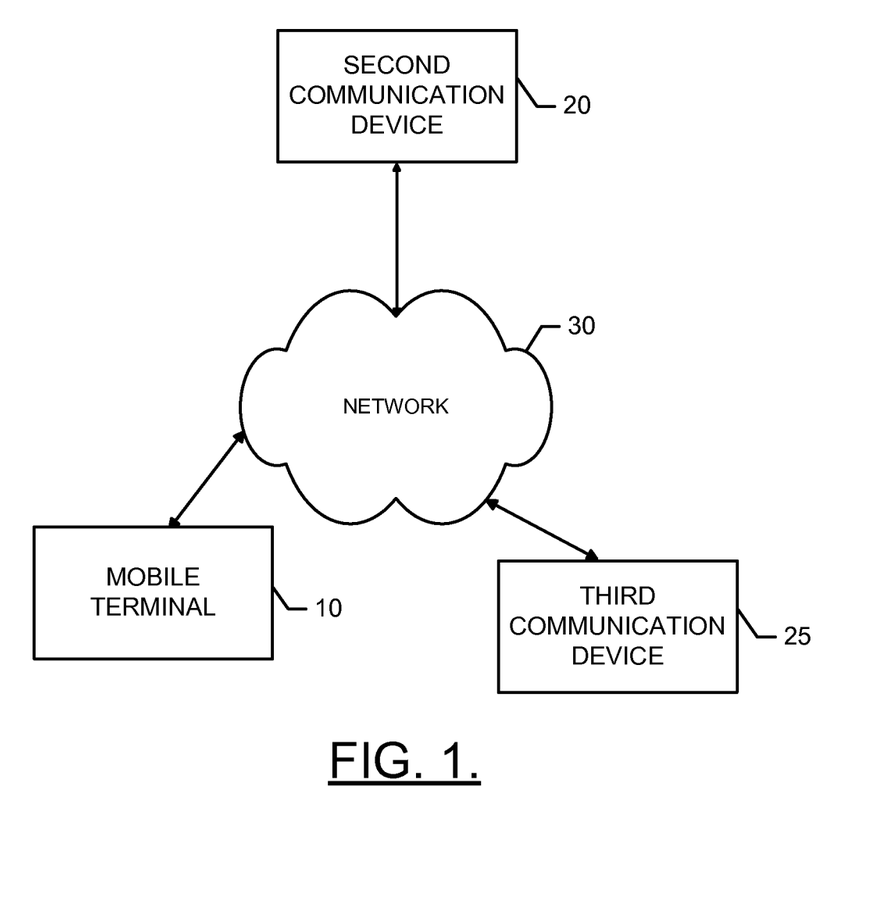
FIG. 1 is a schematic block diagram of a system according to an example embodiment of the invention.

FIG. 1 illustrates a generic system diagram in which a device such as a mobile terminal 10 is shown in a communication environment according to some example embodiments. As shown in FIG. 1, a system in accordance with some example embodiments may include a first communication device (for example, mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ an embodiment of the present invention may comprise all the devices illustrated and/or described herein. While example embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) and/or Global Navigation Satellite System (GLONASS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. According to some example embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. According to some example embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/ or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore the mobile terminal 10 and the second and third communication devices 20 and 25 may communicate in accordance with, for example, Radio Frequency (RF), Cellular, Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

According to some example embodiments, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

According to some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

According to some example embodiments, the mobile terminal as well as the second and third communication devices 20 and 25 may employ an apparatus (for example, apparatus of FIG. 2) capable of functioning according to example embodiments of the invention. In some example embodiments, the second communication device 20 may be a network device (e.g., server). In this example embodiment, the second communication device 20 may receive one or more reviews (e.g., reviews of one or more businesses or other entities) from the mobile terminal 10 and/or the third communication device 25. The reviews may be generated based in part on detected acoustic sentiment and textual sentiment corresponding to speech content.

Figure 2:
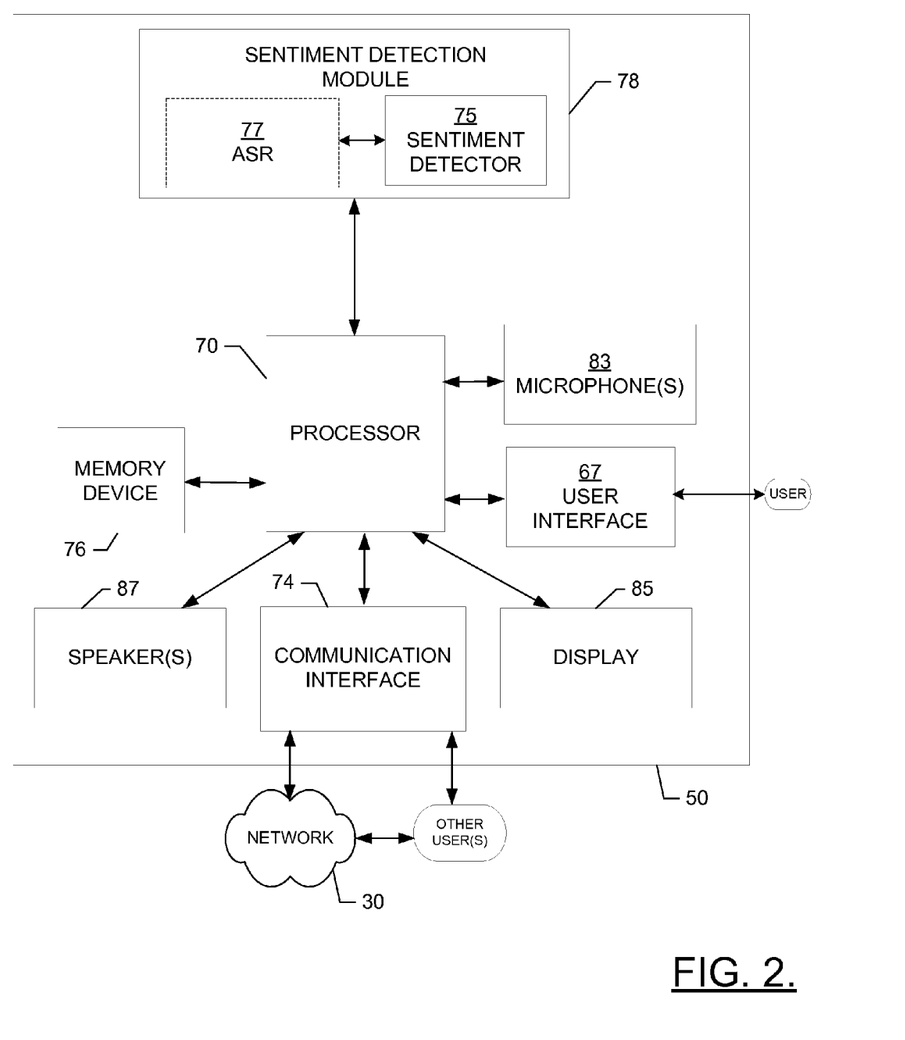
FIG. 2 is a schematic block diagram of an apparatus according to an example embodiment of the invention.

FIG. 2 illustrates a schematic block diagram of an apparatus according to an example embodiment. Some example embodiments of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, some embodiments of the invention may be embodied wholly at a single device (for example, the mobile terminal 10), by a plurality of devices in a distributed fashion (for example, on one or a plurality of devices in a P2P network) or by devices in a client/server relationship. Furthermore, it should be noted that the devices or elements described below may not be mandatory and thus some may be omitted in some embodiments.

Referring now to FIG. 2, the apparatus 50 may include or otherwise be in communication with a processor 70, a user interface 67, a communication interface 74, a memory device 76, a display 85, one or more speakers 87 (also referred to herein as speaker(s) 87), one or more microphones 83 (also referred to herein as microphone(s) 83) and a sentiment detection module 78. The sentiment detection module 78 may include an optional automatic speech recognizer (ASR) 77 and a sentiment detector 75. In some example embodiments, the ARS 77 may not be included in the sentiment detection module 78.

According to some example embodiments, the display 85 may be a touch screen display. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In some embodiments, the memory device 76 may be a tangible memory device that is not transitory. The memory device 76 may be configured to store information (for example, voice data (e.g., speech data), audio data, video data, etc.), data, files, applications, instructions or the like for enabling the apparatus to carry out various functions in accordance with example embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, pictures (e.g., images), videos, audio data, etc.).

The apparatus 50 may, according to some example embodiments, be a mobile terminal (for example, mobile terminal 10) or a fixed communication device or computing device configured to employ example embodiments of the invention. According to some example embodiments, the apparatus 50 may be embodied as a chip or chip set. In other words, the apparatus 50 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing embodiments of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

The communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

In some example embodiments, the processor 70 may be embodied as, include or otherwise control the sentiment detection module 78. The sentiment detection module 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the sentiment detection module 78, as described below. Thus, in an example in which software is employed, a device or circuitry (for example, the processor 70 in one example) executing the software forms the structure associated with such means.

The sentiment detection module 78 may include an optional ASR 77 and a sentiment detector 75. The ASR 77 may be any means such as a device or circuitry operating in accordance with software or otherwise embodied in hardware or a combination of hardware and software (for example, processor 70 operating under software control) configured to perform the corresponding functions of the ASR 77, as described herein. The ASR 77 may be configured to capture speech data (e.g., speech signals), via microphone(s) 83, and may convert the speech data to corresponding text data. The text data may include one or more textual words (also referred to herein as word transcript). The ASR 77 may determine a confidence score for the textual words to determine a level of accuracy of the words. In one example embodiment, in an instance in which a confidence score(s) for a textual word(s) is below a predetermined threshold, the ASR 77 may discard the corresponding textual word(s). For purposes of illustration and not of limitation, in an instance in which a confidence score for a textual word is zero, the ASR 77 may discard this textual word. In one example embodiment, the textual words generated from the speech data may be provided to the sentiment detector 75.

The sentiment detector 75 may be any means such as a device or circuitry operating in accordance with software or otherwise embodied in hardware or a combination of hardware and software (for example, processor 70 operating under software control) configured to perform the corresponding functions of the sentiment detector 75, as described herein. In an example embodiment, the sentiment detector 75 may receive the textual data generated by the ASR 77 as well as the corresponding speech data from the microphone(s) 83. In this regard, the sentiment detector 75 may utilize the speech data and the corresponding textual data to determine acoustic sentiment and textual sentiment relating to the words of the corresponding acoustic data (e.g., speech) and textual data. The sentiment detector 75 may determine a confidence score for the acoustic sentiment and a confidence score for the textual sentiment. Based in part on the confidence scores, the sentiment detector 75 may determine a composite sentiment and overall confidence score associated with the words of the acoustic data (e.g., speech and text data).

In one example embodiment, the speech data evaluated by the ASR 77 and/or the sentiment detector 75 may relate to a review(s). For example, a user of the apparatus 50 may speak into the microphone(s) 83 and provide a spoken review(s) about an experience(s) (e.g., dining at a restaurant, visiting a bar, attending a game, etc.). In this regard, the sentiment detection module 78 may convert the speech to text and may evaluate the converted text as well as the speech to determine a sentiment (e.g., how the user felt) regarding the experience(s). The sentiments, detected by the sentiment detection module 78, may be assigned a rating (e.g., five stars for a highest rating, one star for a lowest rating) corresponding to an attribute(s) and the rating(s) may be utilized by the processor 70 in generating a review(s). The processor 70 may provide the review(s) to other apparatuses 50 or a network device (e.g., communication device 20) which may, but need not, store the review(s) in a memory. In this regard, the network device may provide the review(s) to other apparatuses 50 of users.

In some example embodiments, the processor 70 may store the generated review(s) locally in memory device 76. The processor 70 may provide the generated review(s) stored in memory device 76 to one or more apparatuses 50 of users upon receipt of a request. Alternatively, the processor 70 may send the generated review(s) to other apparatuses 50 of users in response to receipt of an indication of a selection by a user of apparatus 50.

Figure 3:
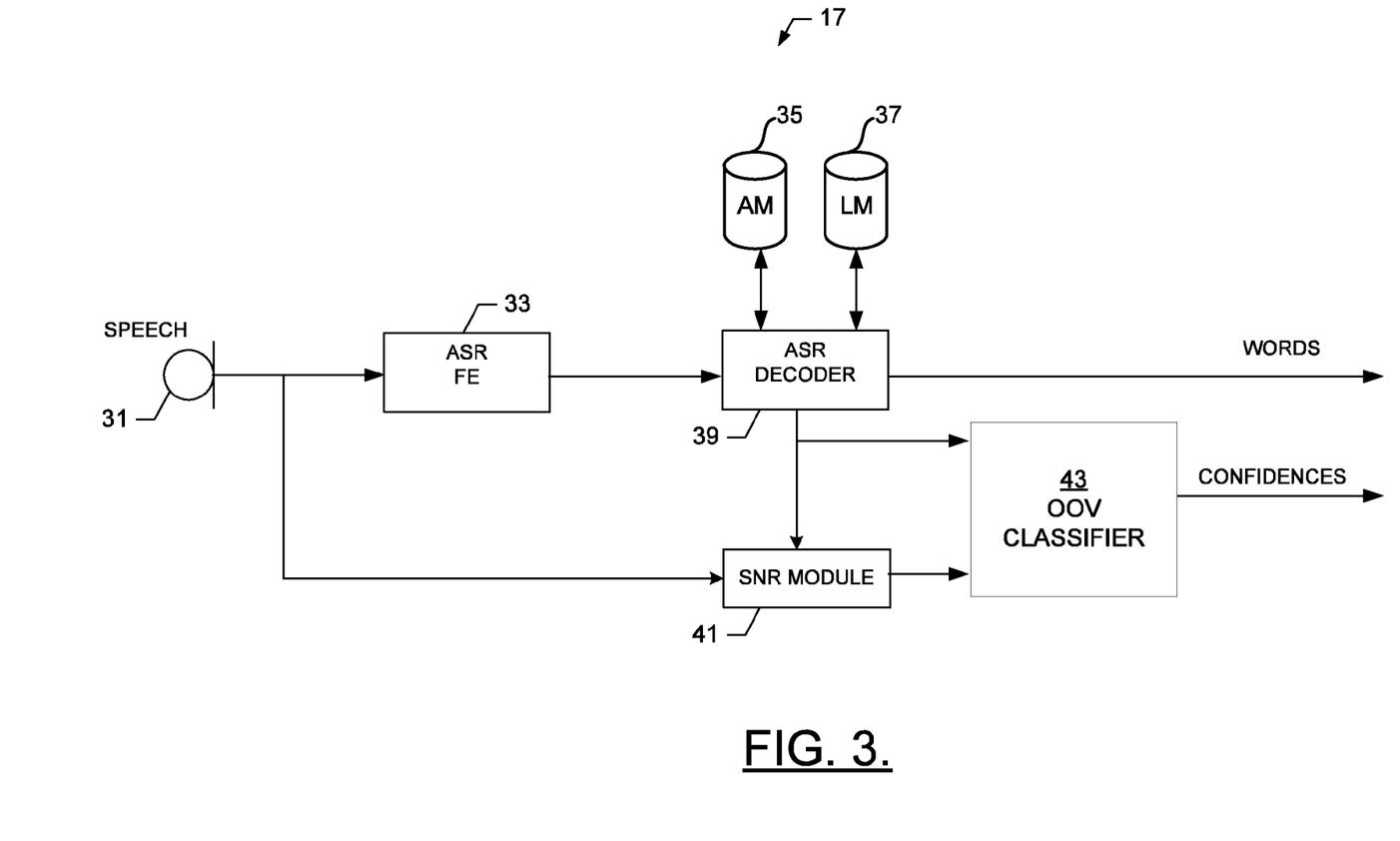
FIG. 3 is a schematic block diagram of an automatic speech recognizer according to an example embodiment of the invention.

Referring now to FIG. 3, a block diagram of an example embodiment of an automatic speech recognizer is provided. The automatic speech recognizer (ASR) 17 (e.g., the ASR 77) may convert spoken speech data to corresponding textual data (e.g., textual words corresponding to the spoken speech). In an example embodiment, the spoken speech may relate to a review (e.g., a spoken review (e.g., a spoken review of a business or other entity, etc.)) by a user of an apparatus 50. However, in some example embodiments, the spoken speech may relate to any other suitable speech data, which may not necessarily relate to a review. Additionally, the ASR 17 may determine a level of confidence for words of the textual data that are converted from the spoken speech, as described more fully below.

In an instance in which a user speaks in a microphone 31 (e.g., a microphone(s) 83), the microphone 31 may provide the corresponding speech data (e.g., a speech signal(s)) to an ASR frontend (FE) device 33 and a Signal-to-Noise Ratio (SNR) module 41. The ASR frontend device 33 may convert the speech data to corresponding feature vectors. The feature vectors generated by the ASR frontend device 33 may condense the speech data captured by the microphone 31. In this regard, the size of the speech data may be reduced to enable efficient processing of the speech data, while maintaining relevant information corresponding to the speech.

The ASR FE 33 may send the feature vectors, corresponding to the speech data, to the ASR decoder 39. In this regard, the ASR decoder 39 may analyze or compare the feature vectors to an acoustic model (AM) 35 and a language model (LM) 37. The AM 35 may be a file which may be stored in a memory (e.g., memory device 76). The AM 35 may include audio recordings of speech and corresponding transcriptions (also referred to herein as acoustic representations) (e.g., taken from a speech corpus (e.g., a database or memory of speech audio files and text transcriptions)) which may be compiled into statistical representations of the sounds that make up each word through a process called training. The LM 37 may be a file that may be stored in a memory (e.g., memory device 76). The LM 37 may include the probabilities of sequences of words (also referred to as language representations) (e.g., predefined combinations of words). In this regard, LM 37 may include candidate words or words of sentences. The LM 37 may capture the properties of a language based on training data to predict the next word in a speech sequence. In an example embodiment the training data, utilized by a processor (e.g., processor 70), to train the data of the AM 35 and the LM 37 may relate to various domains (e.g., restaurants, hotels, car rentals, products, medical, health care and any other suitable domains). The LM 37 may be used, by the ASR decoder 39, for performing dictation, or transcription of speech data (e.g., converting speech data to text).

The ASR decoder 39 may utilize the acoustic representations and the language representations of speech of the AM 35 and the LM 37 to detect or recognize speech of the received feature vectors. In this regard, the ASR decoder 39 may analyze the feature vectors received from the ASR FE 33 and may match the feature vectors against the acoustic representations and the language representations of speech to identify or determine the words corresponding to the feature vectors. The ASR decoder 39 may compare the feature vectors to acoustic representations of the AM 35 and/or language representations of the LM 37 to generate or output a most likely word(s) or sentence(s) relating to what the user spoke into the microphone 31. In this regard, the ASR decoder 39 may convert the speech received by the microphone 31 to text and may output the most likely word(s) or sentence(s) in text. The textual words that are output may, but need not, be included in a word transcript (also referred to herein as a word transcription) by the ASR decoder 39. The output of the textual words (e.g., a word transcript) may be received by another device (e.g., the sentiment detector 95 of FIG. 4).

In an instance in which the acoustic and language representations of the AM 35 and/or LM 37, respectively, may not relate to the speech of the feature vectors, the ASR decoder 39 may be unable to accurately determine words of the speech of the feature vectors. The acoustic representation may not relate to the speech of the feature vectors in an instance in which it is trained using speech samples from a different population (e.g., children's speech). The language representation may not relate to the speech of the feature vectors in an instance in which the language representation is not trained for the subject matter or domain of the speech of the feature vectors. For purposes of illustration and not of limitation, the ASR decoder 39 may be unable to accurately determine the speech of the feature vectors when the speech of the feature vectors corresponds to astronomy speech data in an instance in which the language representation of the LM 37 is not trained for astronomy related speech. As such, the AM 35 and LM 37 of the example embodiments may be domain dependent and may be associated with any suitable number of domains (e.g., restaurants, products, rental cars, hotels or any other suitable domains) to enable the ASR decoder 39 to match received features vectors to acoustic and language representations of a corresponding domain.

The SNR module 41 may detect any loss in the quality of the speech received from the microphone 31. Additionally, the SNR module 41 may receive the textual words or sentences and/or associated time alignment from the ASR decoder 39 and may send an indication of the signal loss associated with corresponding words (e.g., textual words) to the Out of Vocabulary (OOV) classifier 43. Based on the signal loss detected by the SNR module 41 for corresponding words, the OOV classifier 43 may determine a confidence (e.g., a confidence score) as to the accuracy of each of the words. In this regard, for example in an instance in which a portion of the speech data received by the microphone 31 has a poor quality (e.g., detection of a loud noise in the background, etc.), the OOV 43 may determine that there is a low confidence (e.g., a low confidence score) that a corresponding word(s) is accurate. In an instance in which a word(s) is assigned a confidence below a predetermined threshold, the OOV classifier 43 may discard the word(s). On the other hand, the OOV classifier 43 may determine that a word(s) has a high accuracy of being correct in an instance in which signal loss information received from the SNR module 41 indicates that the corresponding word(s) has a good signal quality. In this regard, the OOV classifier 43 may determine that there is a high confidence (e.g., a high confidence score) that the corresponding word(s) is accurate in an instance in which a confidence (e.g., an assigned confidence score) is determined to be above a predetermined threshold. The OOV classifier 43 may generate an output of the confidences (e.g., confidence scores) associated with corresponding words (e.g., textual words) that exceed the predetermined threshold. In this regard, a device (e.g., sentiment detector 95 of FIG. 4) receiving the output of the confidence scores from the OOV classifier 43 may determine the confidence of the corresponding word(s).

Figure 4:
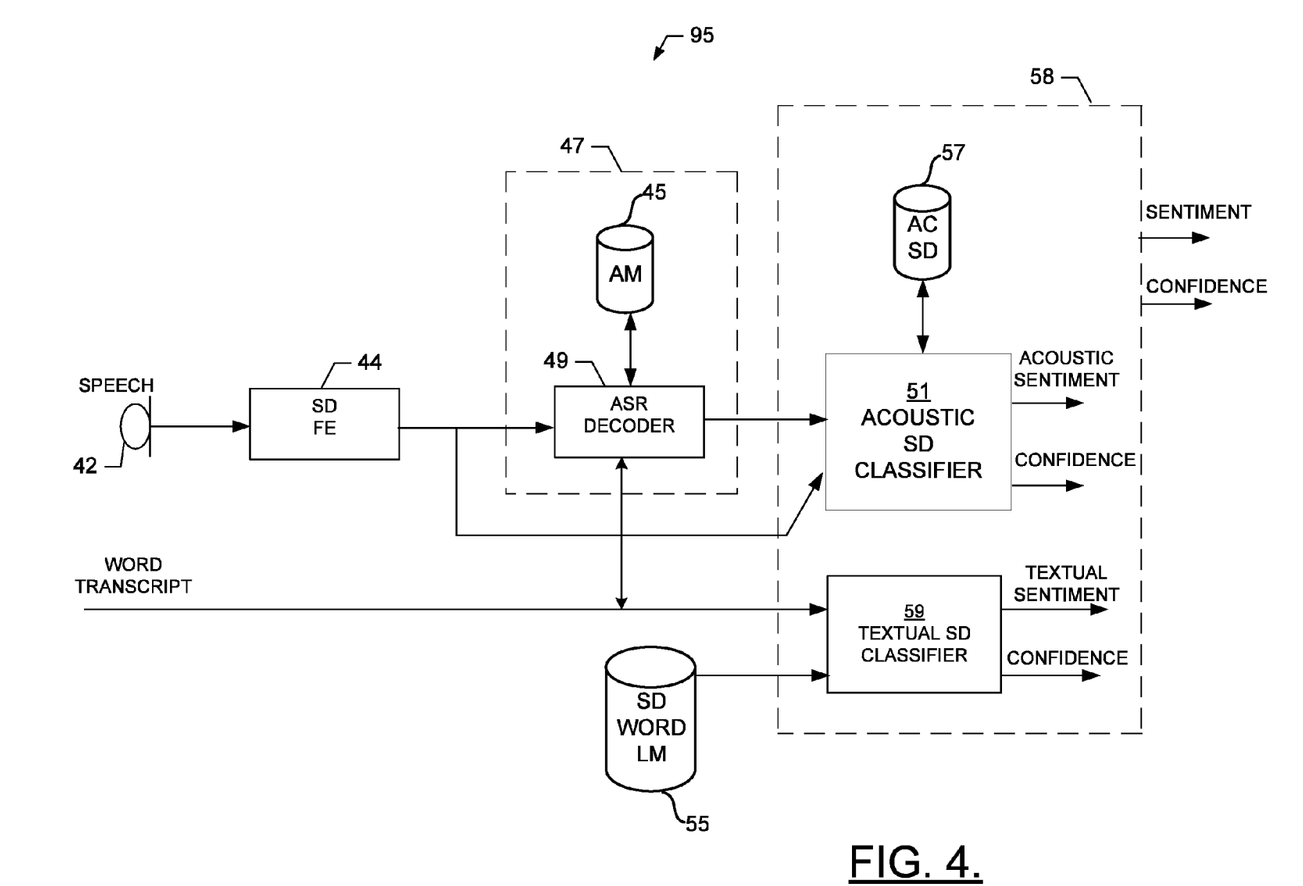
FIG. 4 is a schematic block diagram of a sentiment detector according to an example embodiment of the invention.

Referring now to FIG. 4, a diagram illustrating a sentiment detector according to an example embodiment is provided. The sentiment detector 95 (e.g., the sentiment detector 75 in one example embodiment) may determine acoustic sentiment and textual sentiment corresponding to spoken speech data. The sentiment may correspond to one or more classes of sentiments, including, but not limited to, positive, negative and neutral associated with one or more attributes.

In an example embodiment, the sentiment detector 95 may receive the word transcript (also referred to herein as word transcription), at an input, from the ASR 17 (e.g., ASR 77). Additionally, the microphone 42 (e.g., a microphone(s) 83) may receive the original speech signal captured by the microphone 31. In other words, the microphone 42 may receive the speech data corresponding to the same word(s) or sentence(s) analyzed by the ASR 17 to enable the sentiment detector 95 to determine acoustic sentiment and textual sentiment corresponding to the speech data. As described above, the speech data may, but need not, correspond to a spoken review (e.g., a review of an entity or business (e.g., a restaurant review, a rental car service review, etc.)) by a user of an apparatus (e.g., apparatus 50). In some example embodiments, the speech data may correspond to any suitable data and may not necessarily correspond to a spoken review.

The microphone 42 may provide the speech data to the sentiment detection (SD) frontend (FE) 44 which may convert words of the speech data to Mel Frequency Cepstral Coefficients (MFCCs) and may determine pitch, denoted F0 herein, corresponding to the speech data. For example, the pitch may indicate how low or high a voice is speaking words of the speech data and may be used in part to determine prosodic features. In an example embodiment, the SD FE 44 may derive the MFCCs and pitch F0 in parallel based on the speech data.

The SD FE 44 may send the MFCCs and the pitch F0 corresponding to the speech data to the ASR decoder 49 of a forced alignment module 47. In an example embodiment, the AM 45 may be a file that is stored in a memory (e.g., memory device 76). The AM 45 may include a statistical model of speech based on (e.g., thousands of hours of recorded speech from a large number of speakers (e.g., persons)). The AM 45 may be trained based on any kind of suitable speech corresponding to various domains and the speakers be the same or different. The speech utilized by a processor (e.g., processor 70) for training the AM 45 may be modeled based on the manner in which the general population pronounces basic speech sounds (e.g., phonemes). These basic units may make up the spoken words.

In the example embodiment of FIG. 4, the ASR decoder 49 of forced alignment module 47 may utilize the trained speech (e.g., phonemes) of the AM 45, the word transcript (e.g., text of words), and the received MFCCs, the pitch F0 from the SD FE 44 to align words. For instance, in one example embodiment, the ASR decoder 49 may build a decoding network (e.g., a graph) on basic level (e.g., a state-level Hidden Markov Model (HMM) network in an HMM-based system) using the word transcript, pronunciation rules (e.g., how phonemes make up words) and the AM 45 (e.g., representing what HMM state parameters each of the phonemes have). When the ASR decoder 49 determines that the decoding network is ready, the ASR decoder 49 may match the incoming speech data as represented by sequences of feature vectors (MFCCs) against the decoding network and may determine an optimum path through the decoding network (e.g., a graph). Once this optimum path is found or determined, the ASR decoder 49 may perform a back-tracking step in which the ASR decoder 49 may determine at what time instances the boundaries of corresponding words occurred. In this regard, the ASR decoder 49 of the forced alignment module 47 may break down a sentence(s) by segmenting the sentence(s) into words. The determined time instances may be denoted by corresponding time stamps constituting the word alignment. The ASR decoder 49 may, but need not, include the time stamps and the corresponding words associated with the time stamps in a profile. The ASR decoder 49 may provide the time stamps and the corresponding words to the acoustic SD classifier 51.

The acoustic SD classifier 51 may also receive the MFCCs and pitch F0 corresponding to the speech data output by the SD FE 44. In this regard, the acoustic SD classifier 51 may analyze portions of MFCCs and pitch F0 related to speech, and for each portion the acoustic SD classifier 51 may determine a sentiment label (also referred to herein as an acoustic sentiment label). In this regard, the acoustic SD classifier 51 may detect prosodic information of the portions of the MFCCs and may analyze pitch data in determining sentiment labels. For example, the acoustic SD classifier 51 may analyze an absolute value of the pitch and may also consider a pitch trajectory over one or more words to determine a label (e.g., a sentiment label) for a given word(s). The acoustic SD classifier 51 may evaluate the pitch trajectory over words since the acoustic SD classifier 51 may know what the trajectory and sentiment labels were for previously analyzed words. As such, the acoustic SD classifier 51 may utilize this information in part to generate some estimates of sentiment features (e.g., positive, negative, neutral) based on acoustic information (e.g., an acoustic sentiment based on speech data). The acoustic (AC) sentiment detection (SD) classifier 51 may apply a Support Vector Machine (SVM), Hidden Markov Model (HMM), or Artificial Neural Network (NN) based approach to estimate sentiment features, matching the corresponding acoustic (AC) sentiment detection (SD) model of given sentiments to the incoming speech features.

The acoustic SD classifier 51 may use the time stamps and corresponding aligned words and the sentiment determined for the corresponding portions of the MFCC coefficients based in part on analyzing pitch to determine a confidence as to the accuracy of a determined acoustic sentiment label.

For instance, consider an example in which the acoustic SD classifier 51 assigned sentiments to or more words relating to three segments or portions of a corresponding MFCC, as shown below. In this example, the acoustic SD classifier 51 assigned a positive acoustic sentiment to the first segment corresponding to time stamps indicating a start time of 0.1 seconds (sec.) to 3.19 sec. In this example embodiment, the classifier 51 determined that the confidence that the positive acoustic sentiment is accurate is 0.8 (e.g., 80%). In addition, the acoustic SD classifier 51 assigned a neutral acoustic sentiment to the second segment corresponding to time stamps indicating a start time of 3.2 sec. to 5.1 sec. The acoustic SD classifier 51 determined that the confidence that the neutral acoustic sentiment is accurate is 0.3 (e.g., 30%). Also, the acoustic SD classifier 51 assigned a negative acoustic sentiment to the third segment corresponding to one or more time stamps indicating a start time of 5.11 sec. to 6.3 sec. The acoustic SD classifier 51 determined that the confidence that the negative acoustic sentiment is accurate is 0.5 (e.g., 50%).

| Unit # | Start Time | End Time | Sentiment | Confidence |
|---|---|---|---|---|
| 0 | 0.1 sec. | 3.19 sec. | positive | 0.8 |
| 1 | 3.2 sec. | 5.1 sec. | neutral | 0.3 |
| 2 | 5.11 sec. | 6.3 sec. | negative | 0.5 |

In the above example, the confidence scores (e.g., 80% confident, 30% confident or 50% confident) refer to how certain the acoustic SD classifier 51 is that the decision regarding the sentiment (e.g., positive, negative, neutral) is correct. The acoustic SD classifier 51 may use the quality of a match of a given sentiment model(s) to the incoming speech to determine the confidence score(s) associated with the detected sentiment (e.g., the acoustic SD classifier 51 may use the normalized difference between the best and the second best sentiment scores as a confidence measure; the larger this difference is, the higher the assigned confidence may be).

The acoustic SD classifier 51 may analyze intonation patterns segmented to word boundaries in a sentence. In one example embodiment, the acoustic SD classifier 51 may compare one or more acoustic words represented by feature vector sequences received from the SD FE 44 with corresponding alignment/segmentation received from the ASR decoder 49 to the AC SD model 57.

For purposes of illustration and not of limitation, consider an example in which the acoustic SD classifier 51 compares intonation patterns segmented to word boundaries in a sentence received from the ASR decoder 49 of the forced alignment module 47. In this example, presume that the sentence is "the food of this restaurant was terrible, but the valet parking service was terrific." In this regard, the acoustic SD classifier 51 may know that the user's voice indicated a negative sentiment around the end of the first clause in the example sentence (e.g., the seventh word of the example sentence) and a positive sentiment around the end of the second clause (e.g., the fourteenth word of the example sentence). This detected acoustic sentiment information may be output by the acoustic SD classifier 51. In an example embodiment, this acoustic sentiment information may be used to augment the sentiment detection results from the textual SD classifier 59.

The sentiment detection (SD) word language model (LM) 55 may be a file which may be stored in a memory (e.g., memory device 76). The SD word LM 55 may include the information that may be needed to generate a textual sentiment classification. In this regard, the SD word LM 55 may include input patterns of a large number of sentences from written text such as, for example, written reviews with known sentiment labels. The input patterns of the SD word LM 55 may correspond to one particular or multiple domains (e.g., restaurants, rental cars, hotels, health care or any other suitable domains). In other words, the input patterns of the SD word LM 55 may be domain dependent or domain independent. In one example embodiment, the sentiment labels may correspond to sentiment classes including, but not limited to, positive, negative and neutral sentiments.

The textual SD classifier 59 may receive an input of one or more textual words of the word transcript and may determine how well the textual words fit into either of the sentiment classes (e.g., positive, negative, neutral). For instance, the textual SD classifier 59 may compare received input samples of one or more words of the word transcript to the trained input patterns of sentences from written text that have assigned sentiment labels. For purposes of illustration and not of limitation, the input patterns of sentences (e.g., trained data) of the SD word LM 55 may indicate that textual words such as, for example, "great," "good," "best," and other words of positive connotation denote a positive sentiment, whereas words such as, for example, "okay," "mediocre," "average," and other words of a neutral connotation denote a neutral sentiment. Additionally, for example, the input patterns of sentences (e.g., trained data) of the SD word LM 55 may indicate that textual words such as, for example, "bad," "worst," "horrible" and other words of a negative connation denote a negative sentiment. As such, by comparing the words of the word transcript to the input pattern of trained sentences of the SD word LM 55, the textual SD classifier 59 may determine a textual sentiment of one or more words of the word transcript being analyzed. For example, in an instance in which one or more words of the word transcript corresponds to words such as "the food was great", the textual SD classifier 59 may compare these words to the data of the input patterns of the SD word LM 55 and may determine that "great" denotes a positive sentiment. In this example embodiment, the textual SD classifier 59 may assign a positive sentiment to the textual words "the food was great". In addition, the textual SD classifier 59 may also identify an attribute of a domain from the word transcript and assign the textual sentiment to that attribute automatically. In the above example, the domain is restaurants, the attribute is food quality.

As such, the textual SD classifier 59 may analyze individual words of the word transcript and by comparing words of the input of the word transcript to input patterns of sentences of the SD word LM 55. The textual SD classifier 59 may determine that certain words (e.g., in certain contexts) denote a positive sentiment, and that some others words may denote a neutral or negative sentiment. In addition, the textual SD classifier 59 may determine that some words are irrelevant and may be filler words from a sentiment detection perspective. For example, consider the sentence "We went out to eat with Aunt Gloria to this great place last Friday". In this example, the textual SD classifier 59 may determine each of the words of this sentence other than "great place" is irrelevant with respect to sentiment and corresponds to filler words.

In one example embodiment, the textual SD classifier 59 may include input patterns of a large number of sentences from written text such as, for example, written reviews with known sentiment labels which may correspond to various domains (e.g., restaurants, rental cars, hotels, health care or any other suitable domains) and may be associated with various attributes. As such, the textual SD classifier 59 may include domain dependent models. In this regard, the textual SD classifier 59 may compare one or more received textual words of the word transcript to attributes (e.g., quality (e.g., food quality), ambiance, service, parking, price, etc.) of a specific domain model (e.g., a business(es) (e.g., a restaurant(s), etc.). In this regard, based in part on a particular domain model, the textual SD classifier 59 may categorize/assign a textual sentiment (also referred to herein as textual sentiment labels) to individual domain attributes. In this example embodiment, the output of the textual classification from the textual SD classifier 59 may be textual sentiment labels (e.g., positive, negative, neutral sentiments) to domain specific attributes (e.g., quality (e.g., food quality), ambiance, service, parking, price, etc.). In an example embodiment, the textual sentiment(s) for the corresponding attributes may be utilized by a processor (e.g., processor 70), in part, to generate a rating for the attributes. For example, a positive sentiment for an attribute may be assigned a five star rating by the processor and a negative sentiment for an attribute may, but need not, be assigned a low rating such as, for example, a one star rating. Additionally, for example, a neutral sentiment for an attribute may, but need not, be assigned a three star rating. The processor may assign the ratings based on the sentiment classes in other suitable manners. In this regard, a five star rating may not necessarily be assigned to a positive sentiment, a one star rating may not necessarily be assigned to a negative sentiment and a three star rating may not necessarily be assigned to a neutral sentiment in all instances. The processor may include the ratings and other corresponding information in a review (e.g., a review related to a particular domain (e.g., a business or entity, etc.)), as described more fully below.

For purposes of illustration and not of limitation, consider the example described above in which a user spoke "the food of this restaurant was terrible, but the valet parking service was terrific". In this regard, the textual SD classifier 59 may compare the received textual words of a word transcript corresponding to user's speech to input patterns of sentences in a particular domain such as, for example, a restaurant domain. In this example, the textual SD classifier 59 may assign a negative sentiment to an attribute such as, for example, food quality since the food was described as being terrible. Conversely, the textual SD classifier 59 may assign a positive sentiment to an attribute such as, for example, parking since the valet parking service was described as being terrific. In one example embodiment, the textual sentiment(s) for the particular attributes may be utilized by a processor (e.g., processor 70) to generate a rating for the attributes and these ratings may be utilized by the processor, in part, to generate a review, as described more fully below. Although the example above relates to a restaurant, the textual SD classifier 59 may assign textual sentiments to attributes in any other suitable domains (e.g., entities or businesses (e.g., rental cars, hotels, products, etc.).

In another example embodiment, the textual classifier 59 may compare textual words of the word transcript to domain independent data of the SD word LM 55. In this example embodiment, the domain independent data of the SD word LM 55 may, but need not be, one or more sentences such as, for example "the <noun> was great". In this regard, by utilizing a generic noun tag, the textual SD classifier 59 may accept a wider range of nouns than nouns relevant to a particular domain (e.g., a restaurant domain, a hotel domain, etc.).

In an example embodiment, the textual SD classifier 59 may determine a confidence relating to the accuracy of an assigned textual sentiment. In this regard, the confidence may be regarded as a byproduct of the textual sentiment classification by the textual SD classifier. The classifier may determine how well the input fits into the positive, negative and neutral sentiment classes. Consider for example, an instance in which the input words of the word transcript received by the textual SD classifier 59 relate to "great sushi".

| Input | Sentiment | Score |
|---|---|---|
| "great sushi" | positive | 0.7 |
| "great sushi" | negative | 0.1 |
| "great sushi" | neutral | 0.2 |

In this example, the textual SD classifier 59 may compare the input of textual words "great sushi" to input patterns of the SD word LM 55. As described above, a word such as "great" in the SD word LM 55 may have a positive sentiment. In this example embodiment, the textual SD classifier 59 may determine a classification score for each of the classes with respect to the input words "great sushi". The textual SD classifier 59 may determine that the words "great sushi" relates to a positive sentiment with a classification score of 0.7 (e.g., 70%). Additionally, the textual SD classifier 59 may determine that the words "great sushi" relates to a negative sentiment with a classification score of 0.1 (e.g., 10%). Also, the textual SD classifier 59 may determine that the words "great sushi" relates to a neutral sentiment with a classification score of 0.2 (e.g., 20%). In this example, the textual SD classifier 59 may determine that the textual words "great sushi" has a positive sentiment and may assigned a positive sentiment label to the words "great sushi" since the positive sentiment class has the highest score. In this example embodiment, the textual SD classifier 59 may calculate a higher score (e.g., 0.7) for the positive sentiment class since the word "great" has a positive sentiment label in the SD word LM 55.

In one example embodiment, a confidence score for this classification may be determined by the textual SD classifier 59 as the difference between the highest and second highest classification scores (e.g., 0.7-0.2=0.5 (e.g., 50%)). In an instance in which the LM does not include an identified sentiment for words (e.g., profanity or an unknown slang word) of the word transcript received by the textual SD classifier 59, the textual SD classifier 59 may determine a low classification score for each of the positive, negative and neutral sentiment classes. In this example, the textual SD classifier 59 may assign a slightly higher score to the neutral class as opposed to the positive and negative sentiment classes. However, this slightly higher score may still result in a low confidence score.

As described above, the acoustic SD classifier 51 may determine one or more items of acoustic sentiment and corresponding confidences relating to the accuracy of the items of acoustic sentiment. Additionally, as described above, textual SD classifier 59 may determine one or more items of textual sentiment and corresponding confidences relating to the accuracy of the items of the textual sentiment. The textual sentiment and the acoustic sentiment relate to a textual words and spoken (e.g., acoustic) words corresponding to the same original speech data of a user (e.g., a user of an apparatus 50), as captured by microphone 42. In one example embodiment, the original speech data of the user may correspond to a spoken review of an entity (e.g., a restaurant, hotel, a product, or any other suitable entity) or experience.

In an example embodiment, the combiner device 58 may combine the items of acoustic sentiment and the items textual sentiment as well as the confidences corresponding to the acoustic sentiment and the textual sentiment to determine a composite sentiment and overall confidence. In one example embodiment, the combiner device 58 may combine the items of textual sentiment and the items of acoustic sentiment to determine a composite sentiment by calculating an average of the acoustic sentiment and the textual sentiment. In addition, the combiner device 58 may combine the confidence scores associated with the items of acoustic sentiment and the items textual sentiment to determine an overall confidence score by calculating an average of the confidence scores for the acoustic sentiment and the textual sentiment. By combining the acoustic sentiment and the textual sentiment, the sentiment detector 95 may achieve better accuracy in determining sentiment of speech data spoken by a user.

In an another example embodiment, the combiner device 58 may determine the composite sentiment and the overall confidence based in part on an assigned bias to favor the results of the items of acoustic sentiment and confidences generated by the acoustic SD classifier 51 or the items of textual sentiment and confidences generated by the textual SD classifier 59. As such, for example, in an instance in which the combiner device 58 determines that there is a bias to favor the results of the textual SD classifier 59, the combiner device 58 may select the items of textual sentiment and corresponding confidences as the composite sentiment and overall confidence. On the other hand, in an instance in which the combiner device 58 determines that there is a bias to favor the results of the acoustic SD classifier 51, the combiner device 58 may select the items of acoustic sentiment and corresponding confidences as the composite sentiment and overall confidence.

In one example embodiment, one or more sentiments (e.g., a positive sentiment, a negative sentiment, and a neutral sentiment) may be associated with a composite sentiment (e.g., determined by the combiner device 58). These sentiments may be associated with one or more attributes corresponding to a domain(s) and may be provided by the combiner device 58 to a processor (e.g., processor 70). The processor may utilize the sentiments associated with attributes in part to assign ratings to the attributes. These ratings may be utilized by the processor to generate a review related to the domain(s).

For purposes of illustration and not of limitation, in the context of a restaurant (e.g., a restaurant domain), the attributes may, but need not be, food quality, ambience, service, parking, price, etc. As such, in this example presume that the food quality attribute is assigned a negative sentiment (e.g., based on classifications of the acoustic SD classifier 51 and/or the textual SD classifier 59) and that the parking attribute is assigned a positive sentiment (e.g., based on classifications of the acoustic SD classifier 51 and/or the textual SD classifier 59). As such, the processor may generate a rating for these attributes. In this example, the processor may determine that the positive sentiment associated with the parking attribute corresponds to a five star rating and that the negative sentiment associated with the food quality attribute corresponds to a one star rating.

The processor may include this information in a review (e.g., a restaurant review, etc.) indicating the ratings for the attributes. The processor (e.g., processor 70) may provide the review to apparatuses (e.g., apparatus 50) of other users and/or to a network device(s) (e.g., second communication device 20) via a network (e.g., network 30). In an instance in which the review is provided to a network device, users of other apparatuses 50 may access the review from the network device. It should be pointed out that the processor may determine the ratings in other suitable manners, for instance a positive sentiment may denote a rating less than five stars and a negative sentiment may denote more than a one star rating in some instances. Additionally, although the above example relates to a domain such as for example, a restaurant(s), the generation of the ratings based on the sentiments assigned to respective attributes for inclusion in a generated review(s) may be performed by the processor for any other suitable domains.

Figure 5:
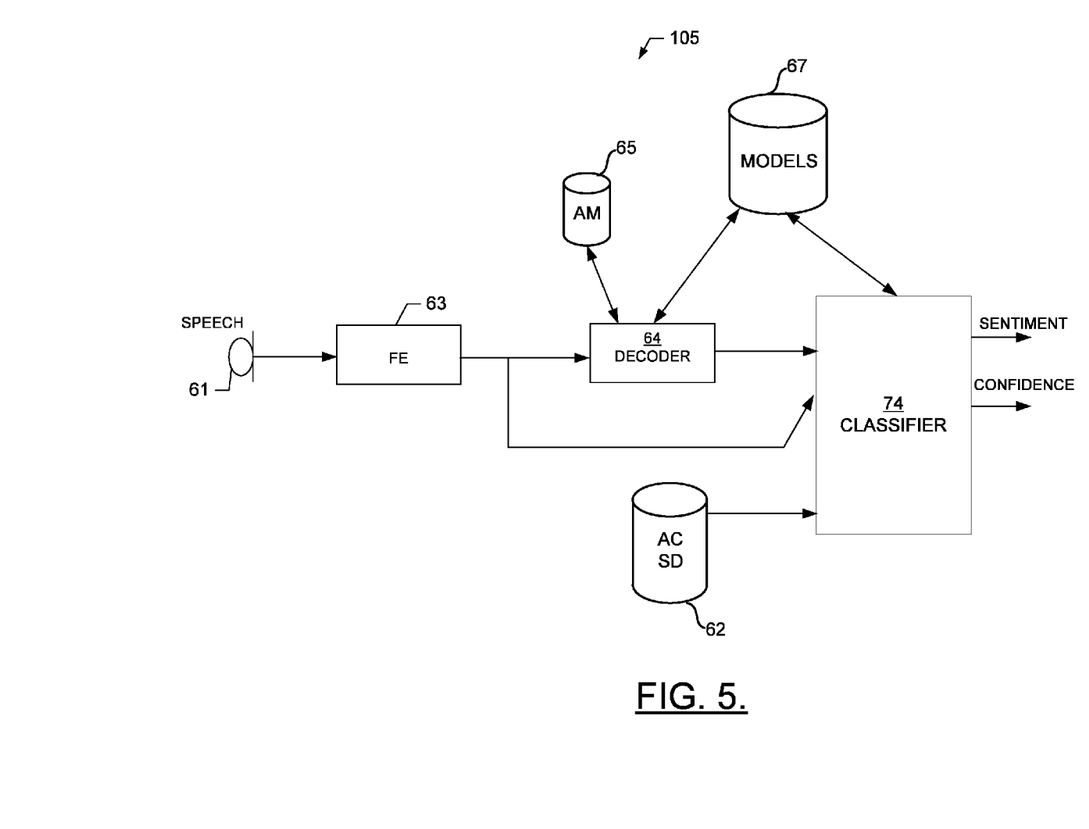
FIG. 5 is a diagram of a sentiment detector according to an another example embodiment of the invention.

Referring now to FIG. 5, a diagram of a sentiment detector according to an example embodiment is provided. The sentiment detector 105 (e.g., the sentiment detector 75 in one example embodiment) may perform automatic speech recognition (ASR) to transcribe speech data to text (e.g., textual words) and may detect acoustic and textual sentiment. In an instance, in which the sentiment detector 105 (e.g., sentiment detector 75) is included in an apparatus (e.g., apparatus 50), an automatic speech recognizer device (e.g., ASR 77) may not be included in the apparatus (e.g., apparatus 50). In an example embodiment, the frontend (FE) 63 may perform functions analogous to the ASR FE 33 and the SD FE 44. In this regard, the FE 63, for example, may receive speech data from microphone 61 (e.g., a microphone(s) 83) corresponding to spoken words of a user of an apparatus (e.g., apparatus 50). The FE 63 may convert the speech data to MFCCs and may detect pitch, denoted F0, of the speech data. The FE 63 may provide the MFCCs and pitch data to the decoder 64.

The decoder 64 may perform Hidden Markov Model (HMM), Viterbi decoding, forward-backward decoding (FB decoding) or any other suitable type of decoding. In one example embodiment, the decoder 64 may perform functions analogous to the ASR decoder 43 and the ASR decoder 49. In this regard, the decoder 64 may convert the speech data related to the feature vectors of the MFCCs to corresponding textual data to generate a word transcript (e.g., a word transcription). The words of the word transcript may be generated by the decoder 64 based in part on comparing speech data associated with feature vectors of the MFCCs to input patterns of an acoustic model (AM) 65 and a language model (e.g., language model 37) of the models 67. In an example embodiment, the decoder 64 may provide one or more determined signal-to-noise ratio estimates corresponding to the words to an Out of Vocabulary (OOV) classifier (e.g., OOV classifier 43) of the classifier 74 to enable the OOV classifier to determine confidences (e.g., confidence scores) associated with the textual words. Additionally, the decoder 64 may perform forced alignment on the acoustic words of the speech data corresponding to the MFCCs to align and segment the corresponding acoustic words. The decoder 64 may generate time stamps for the corresponding acoustic words and the time stamps and corresponding words may be included in a profile. The decoder 64 may perform the forced alignment in parallel with the conversion of the speech data to the textual words.

The decoder 64 may provide the profile to the classifier 74 which may include the OOV classifier, an acoustic SD classifier and a textual SD classifier. The OOV classifier, the acoustic classifier and the textual SD classifier of the classifier 74 may utilize Support Vector Machine (SVM) or Probabilistic Support Vector Machine (PSVM) features. In an example embodiment, the acoustic classifier (e.g., acoustic SD classifier 51) of the classifier 74 may obtain the words of the profile and may compare the words to input patterns of an acoustic (AC) sentiment detection (SD) model 62 (e.g., a file stored in a memory (e.g., memory device 76)) to determine acoustic sentiments (e.g., acoustic sentiment labels) corresponding to the acoustic words of the profile and confidences scores associated with the determined acoustic sentiments.

Additionally, the decoder 64 may provide the textual words of the word transcript to the textual classifier (e.g., textual SD classifier 59) of the classifier 74.

In this regard, the textual classifier may compare the textual words to input patterns of a language model (e.g., SD word LM 55) of the models 67 to determine textual sentiments (e.g., textual sentiment labels) corresponding to the textual words and corresponding confidences related to the accuracy of the textual sentiments. The classifier 74 may combine the acoustic sentiment and corresponding confidences as well as the textual sentiments and corresponding confidences to determine a composite sentiment and overall confidence. In one example embodiment, the classifier 74 may combine the acoustic sentiment and corresponding confidences and the textual sentiments and corresponding confidences to determine a composite sentiment(s) and confidence(s) in a manner analogous to the combiner device 58. In an example embodiment, one or more sentiments (e.g., sentiment labels) of an integrated sentiment may be associated with one or more attributes of a domain which may be provided to a processor (e.g., processor 70) for generating corresponding ratings. The ratings may be provided in one or more reviews generated by the processor.

It should be pointed out that in the example embodiment of FIG. 5, the language models (e.g., LM 37, SD word LM 55) of the models 67 may be word (or sub-word) N-GRAM (NGRAM) language models utilized for speech recognition (e.g., for conversion of speech to text) as well as text-based sentiment detection. As referred to herein, a NGRAM may denote grammar defined over a contiguous sequence of n words (or of at most n words meaning that a 5-gram language model may also include 4-grams, 3-grams, bi-grams and uni-grams).

Figure 6:
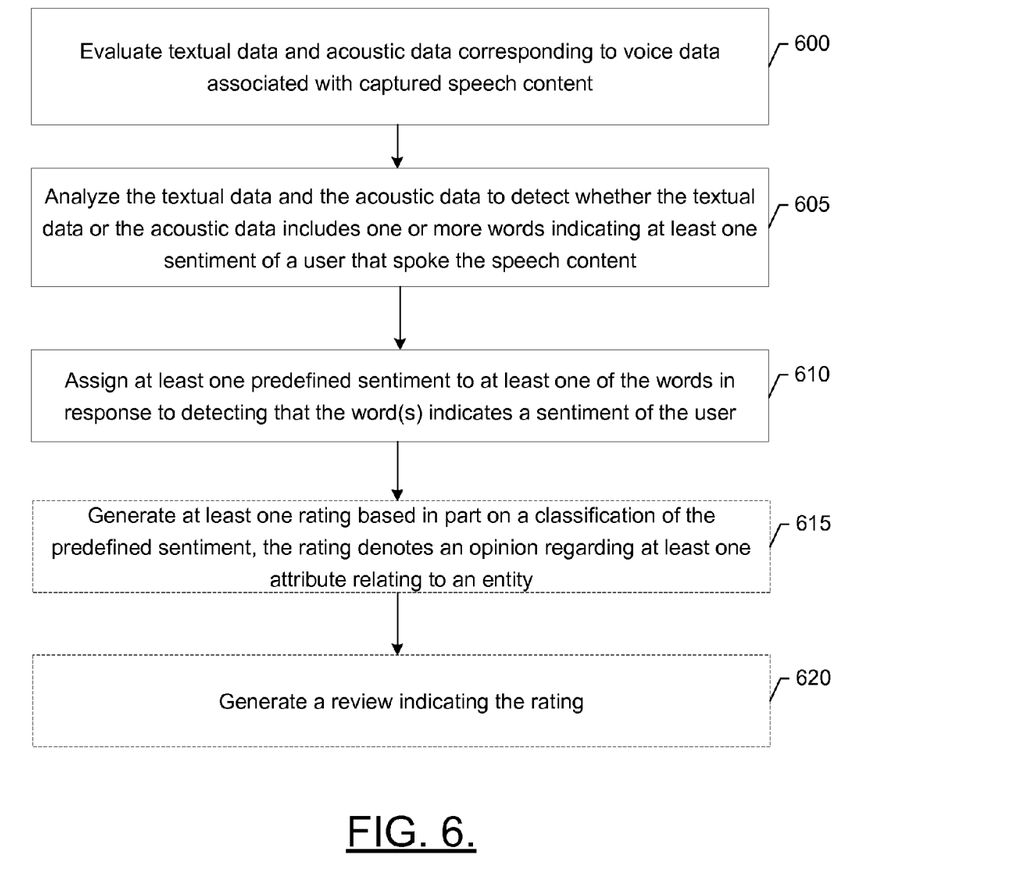
FIG. 6 illustrates a flowchart for utilizing textual data and acoustic data to determine sentiment associated with speech content according to an example embodiment of the invention.

Referring now to FIG. 6, a flowchart for utilizing textual data and acoustic data corresponding to speech data to detect sentiment according to an example embodiment is provided. At operation 600, an apparatus (e.g., apparatus 50) may include means such as the processor 70, the sentiment detection module 78 and/or the like, for evaluating textual data and acoustic data corresponding to voice data associated with captured speech content. At operation 605, an apparatus (e.g., apparatus 50) may include means such as the processor 70, the sentiment detection module 78 and/or the like for analyzing the textual data and the acoustic data to detect whether the textual data or the acoustic data includes one or more words indicating at least one sentiment of a user that spoke the speech content. At operation 610, an apparatus (e.g., apparatus 50) may include means such as the processor 70, the sentiment detection module 78 and/or the like for assigning at least one predefined sentiment (e.g., a positive sentiment label, a negative sentiment label, a neutral sentiment label, etc.) to at least one of the words in response to detecting that the word(s) indicates a sentiment of the user.

Optionally, at operation 615, an apparatus (e.g., apparatus 50) may include means such as the processor 70 and/or the like for generating at least one rating (e.g., five stars, 3 stars, etc.) based in part on a classification of the predefined sentiment. The rating may denote an opinion (e.g., an opinion of a user) regarding at least one attribute (e.g., food quality, price, ambience, service, parking, etc.) relating to an entity (e.g., a business (e.g., a restaurant, a hotel, etc.)). Optionally, at operation 620, an apparatus (e.g., apparatus 50) may include means such as the processor 70 and/or the like for generating a review (e.g., a review of a business (e.g., a restaurant review, hotel review, etc.)) indicating the ratings. The generated review may correspond to a spoken review of a user associated with the speech content. An apparatus (e.g., apparatus 50) may provide the generated review to one or more devices (e.g., other apparatuses 50, a network device (e.g., communication device 20)).

It should be pointed out that FIG. 6 is a flowchart of a system, method and computer program product according to some example embodiments of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in some example embodiments, the computer program instructions which embody the procedures described above are stored by a memory device (for example, memory device 76) and executed by a processor (for example, processor 70, sentiment detection module 78). As will be appreciated, any such computer program instructions may be loaded onto a computer or other programmable apparatus (for example, hardware) to produce a machine, such that the instructions which execute on the computer or other programmable apparatus cause the functions specified in the flowchart blocks to be implemented. In some example embodiments, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, an apparatus for performing the method of FIG. 6 above may comprise a processor (for example, the processor 70, the sentiment detection module 78) configured to perform some or each of the operations (600-620) described above. The processor may, for example, be configured to perform the operations (600-620) by performing hardware implemented logical functions, executing stored instructions, or executing algorithms for performing each of the operations. Alternatively, the apparatus may comprise means for performing each of the operations described above. In this regard, according to some example embodiments, examples of means for performing operations (600-620) may comprise, for example, the processor 70 (for example, as means for performing any of the operations described above), the sentiment detection module 78 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   evaluating textual data and acoustic data corresponding to voice data associated with captured speech content;
   analyzing the textual data and the acoustic data to detect whether the textual data or the acoustic data comprises one or more words indicating at least one sentiment of a user that spoke the speech content;
   assigning, via a processor, at least one predefined sentiment to at least one of the words in response to detecting that the word indicates the sentiment of the user, wherein the at least one assigned predefined sentiment corresponds to at least one attribute of a domain;
   generating at least one rating based in part on a classification of the predefined sentiment, the rating denotes an opinion regarding the attribute relating to an entity; and
   generating a review indicating the rating.

2. The method of claim 1, wherein the textual data comprises textual words and the acoustic data comprises spoken words and wherein assigning the at least one predefined sentiment comprises assigning a textual sentiment to the at least one word and an acoustic sentiment to the at least one word, wherein the at least one sentiment of the user denotes at least one opinion of the user.

3. The method of claim 2, further comprising:
   combining the textual sentiment and the acoustic sentiment to determine a composite sentiment associated with the at least one word.

4. The method of claim 3, further comprising:
   determining a confidence associated with the composite sentiment, the confidence indicating a measure of accuracy relating to the composite sentiment.

5. The method of claim 1, wherein assigning the at least one predefined sentiment comprises classifying the word according to a plurality of sentiment classifications that are associated with a determined confidence score and wherein the method further comprises:
   determining that the assigned predefined sentiment corresponds to the sentiment classification that comprises a highest confidence score.

6. The method of claim 1, further comprising:
   enabling provision of the generated review to one or more devices.

7. The method of claim 1, wherein prior to evaluating the textual data and the acoustic data, the method further comprises converting the speech data to the textual data and wherein the speech data corresponds to a spoken review of the user relating to an entity.

8. The method of claim 1, wherein generating the review further comprises generating the review based in part on a spoken review of the user relating to the entity,
   wherein the opinion comprises an opinion of the user.

9. An apparatus comprising:
   at least one processor; and
   at least one memory including computer program code, the at least one memory and the computer program code configured to, with the at least one processor, cause the apparatus to perform at least the following:
   evaluate textual data and acoustic data corresponding to voice data associated with captured speech content;
   analyze the textual data and the acoustic data to detect whether the textual data or the acoustic data comprises one or more words indicating at least one sentiment of a user that spoke the speech content;
   assign at least one predefined sentiment to at least one of the words in response to detecting that the word indicates the sentiment of the user, wherein the at least one assigned predefined sentiment corresponds to at least one attribute of a domain;
   generate at least one rating based in part on a classification of the predefined sentiment, the rating denotes an opinion regarding the attribute relating to an entity; and
   generate a review indicating the rating.

10. The apparatus of claim 9, wherein the textual data comprises textual words and the acoustic data comprises spoken words and wherein the memory and computer program code are configured to, with the processor, cause the apparatus to:
    assign the at least one predefined sentiment by assigning a textual sentiment to the at least one word and an acoustic sentiment to the at least one word, wherein the at least one sentiment of the user denotes at least one opinion of the user.

11. The apparatus of claim 10, wherein the memory and computer program code are configured to, with the processor, cause the apparatus to:
    combine the textual sentiment and the acoustic sentiment to determine a composite sentiment associated with the at least one word.

12. The apparatus of claim 11, wherein the memory and computer program code are configured to, with the processor, cause the apparatus to:
    determine a confidence associated with the composite sentiment, the confidence indicating a measure of accuracy relating to the composite sentiment.

13. The apparatus of claim 9, wherein the memory and computer program code are configured to, with the processor, cause the apparatus to:
    assign the at least one predefined sentiment by classifying the word according to a plurality of sentiment classifications that are associated with a determined confidence score; and
    determine that the assigned predefined sentiment corresponds to the sentiment classification that comprises a highest confidence score.

14. The apparatus of claim 9, wherein the memory and computer program code are configured to, with the processor, cause the apparatus to:
    enable provision of the generated review to one or more devices.

15. The apparatus of claim 9, wherein prior to evaluate the textual data and the acoustic data, the memory and computer program code are configured to, with the processor, cause the apparatus to:
    convert the speech data to the textual data and wherein the speech data corresponds to a spoken review of the user relating to an entity.

16. The apparatus of claim 9, wherein the memory and computer program code are configured to, with the processor, cause the apparatus to:

generate the review by generating the review based in part on a spoken review of the user relating to the entity, wherein the opinion comprises an opinion of the user.

17. A computer program product comprising at least one non-transitory computer-readable storage medium having computer-readable program code portions stored therein, the computer-readable program code portions in response to execution by a processor causes an apparatus to at least:

evaluate textual data and acoustic data corresponding to voice data associated with captured speech content;

analyze textual data and the acoustic data to detect whether the textual data or the acoustic data comprises one or more words indicating at least one sentiment of a user that spoke the speech content;

assign at least one predefined sentiment to at least one of the words in response to detecting that the word indicates the sentiment of the user, wherein the at least one assigned predefined sentiment corresponds to at least one attribute of a domain;

generate at least one rating based in part on a classification of the predefined sentiment, the rating denotes an opinion regarding the attribute relating to an entity; and generate a review indicating the rating.

18. The computer program product of claim 17, wherein the textual data comprises textual words and the acoustic data comprises spoken words and wherein assign the at least one predefined sentiment further comprises assigning a textual sentiment to the at least one word and an acoustic sentiment to the at least one word, wherein the at least one sentiment of the user denotes at least one opinion of the user.

19. The computer program product of claim 18, wherein the computer-readable program code portions in response to execution by the processor further causes the apparatus to:

combine the textual sentiment and the acoustic sentiment to determine a composite sentiment associated with the at least one word.

20. The computer program product of claim 17, wherein assign the at least one predefined sentiment comprises classifying the word according to a plurality of sentiment classifications that are associated with a determined confidence score and wherein the computer-readable program code portions in response to execution by the processor further causes the apparatus to:

determine that the assigned predefined sentiment corresponds to the sentiment classification that comprises a highest confidence score.

\* \* \* \* \*